(12) United States Patent
Schieke et al.

(10) Patent No.: US 9,789,553 B2
(45) Date of Patent: Oct. 17, 2017

(54) TOOL, METHOD AND MACHINE FOR PRODUCING A TOOTH PROFILE ON A WORKPIECE BY SKIVING

(71) Applicant: Prawema Antriebstechnik GmbH, Eschwege/Werra (DE)

(72) Inventors: Joerg Schieke, Erfurt-Marbach (DE); Walter Holderbein, Eschwege (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 0 days.

(21) Appl. No.: 14/483,687

(22) Filed: Sep. 11, 2014

(65) Prior Publication Data

US 2015/0078850 A1 Mar. 19, 2015

(30) Foreign Application Priority Data

Sep. 13, 2013 (DE) .................. 10 2013 110 130

(51) Int. Cl.
| | |
|---|---|
| *B23F 5/16* | (2006.01) |
| *B23P 15/34* | (2006.01) |
| *B23F 21/06* | (2006.01) |
| *B23F 21/00* | (2006.01) |

(52) U.S. Cl.
CPC .............. *B23F 5/163* (2013.01); *B23F 21/00* (2013.01); *B23F 21/06* (2013.01); *B23P 15/34* (2013.01); *Y10T 407/174* (2015.01); *Y10T 409/105565* (2015.01)

(58) Field of Classification Search
CPC .......... B23F 5/163; B23F 21/00; B23F 21/06; Y10T 409/105565; Y10T 407/174; B23P 15/34
See application file for complete search history.

(56) References Cited

U.S. PATENT DOCUMENTS

| | | | |
|---|---|---|---|
| 5,079,877 A | 1/1992 | Abysov et al. | |
| 8,950,301 B2 | 2/2015 | Marx et al. | |
| 2015/0147129 A1* | 5/2015 | Nagata ................ | B23F 21/12 409/32 |

FOREIGN PATENT DOCUMENTS

| | | |
|---|---|---|
| DE | 102009003601 A1 | 9/2010 |
| EP | 2520390 A1 | 11/2012 |
| EP | 2537616 A1 | 12/2012 |
| GB | 07959 | 0/1898 |

* cited by examiner

*Primary Examiner* — Ryan J Walters
(74) *Attorney, Agent, or Firm* — The Webb Law Firm

(57) ABSTRACT

A tool, a method and a machine for producing a tooth profile by performing a coupled skiving movement between a skiving tool and the workpiece, by rotating the tool about a tool axis of rotation and rotating the workpiece about a workpiece axis of rotation. The tool includes a crown gear, on the front of which a tooth system with a cutting profile is located, which when in use reproduces the tooth profile on the workpiece.

4 Claims, 3 Drawing Sheets

TOOL, METHOD AND MACHINE FOR PRODUCING A TOOTH PROFILE ON A WORKPIECE BY SKIVING

CROSS-REFERENCE TO RELATED APPLICATION

This application claims priority to German Patent Application No. 10 2013 110 130.5 filed Sep. 13, 2013, the disclosure of which is hereby incorporated in its entirety by reference.

BACKGROUND OF THE INVENTION

Field of the Invention

The invention relates to a tool for producing a tooth profile on a workpiece by skiving, a method for producing a tooth profile on a workpiece by performing a coupled skiving movement between a skiving tool and the workpiece, wherein the tool is rotated about a tool axis and the workpiece about a workpiece axis, and a machine for producing a tooth profile on a workpiece by skiving, comprising a skiving tool, a first rotary drive for rotationally-driving the skiving tool about a tool axis, a clamp for retaining the workpiece and a second rotary drive for rotationally-driving the respective workpiece held in the clamp, wherein the rotary drives are coupled together.

Description of Related Art

Skiving is a continuous machining method for producing tooth systems. This production process combines bobbing and shaping by using a continuous rolling process with axial infeed. The efficiency of this skiving technology stems from the fact that tooth systems together with an interference contour can be produced in a short space of time. Here, interference contours are cheeks, shoulders, heels and similar, which in conventional milling would prevent the necessary feed movement. Skiving allows internal and external tooth systems to be produced here.

A characteristic of skiving is the arrangement of the axes of the tool and workpiece at an angle to one another. The intersecting arrangement of axes results in a relative speed between tool and workpiece. This relative movement is used as a cutting movement and has its main cutting direction along the tooth gaps of the workpiece ("tooth gap direction"). The level of the cutting speed is dependent on the respective size of the axis intersection angle and the speed of the machining spindles.

A detailed representation of the current normal method for producing tooth systems by skiving can be found in EP 2 520 390 A1 and EP 2 537 616 A1, to which express reference is made here as evidence of expert understanding.

In order during the production of a workpiece to create the pivoting angle between the workpiece axis and the tool axis necessary for the cutting movement in a machine tool, in conventional skiving machines at least one pivoting axis for relative pivoting of the tool spindle counter to the workpiece axis of rotation is necessary.

Efficient planning and execution of complex machining processes, in particular for the manufacture of tooth systems, which call for multiple axes to be controlled simultaneously within a machine tool, are made possible in production engineering practice thanks to powerful CAM (Computer Aided Manufacturing) systems. As the number of machine axes provided for a production process within a machine tool increases, however, so the complexity of the machine tool to be made available. Increased demands, for example in terms of machine rigidity, the measurement and drive systems, or also machine control, combine to increase machinery and individual manufactured part costs. It is, therefore, sought to limit the machine kinematics necessary for a production process for producing the required workpiece geometry to the minimum possible number of machine axes.

SUMMARY OF THE INVENTION

Against the background of the state of the art outlined above, the object of the invention was to specify a tool, a method and a machine, which while reducing the production effort allow the production of a tooth profile on a workpiece by skiving.

Advantageous configurations of the invention are specified in the dependent claims and will be explained in detail in the following together with the general inventive idea.

A tool according to the invention for producing a tooth profile on a workpiece by skiving accordingly is modelled as a crown gear, on the front of which a cutting profile is provided, which when in use reproduces the tooth profile on the workpiece.

In a tool according to the invention, accordingly on a front side of a tool base body in the axial direction there is a raised tooth system with a cutting profile, which in skiving operation plunges with a cutting surface into the respective workpiece and by peeling chips off there exposes the respective tooth profile. The tool base body can, for example, be a ring or a disc, which is coupled with a suitably formed support section or provided with another suitable coupling element, via which when in use the coupling of the tool to a tool spindle or a machine tool takes place. Typically, with the tool according to the invention, the base body and the support section are formed from a single piece, wherein at the free end of the support section a coupling section is modelled, via which an interlocking and torque-tight coupling to the tool spindle of the respective skiving tool can take place.

The tooth system provided on a tool according to the invention, supporting the respective cutting profile, can be a crown gear, in particular a planar tooth system, in which the individual teeth are aligned starting from an imaginary common centre in a radial direction. In a practically-oriented design, the tooth system is modelled as a ring running circularly in an edge region of the front side of the tool.

Here, the cutting surfaces of the cutting profile of a tool according to the invention are present in an optimum manner on the external circumferential front faces of the teeth of the tooth system. Here, the externally-oriented cutting surfaces promote a secure chip removal, since the cutting area in the direction of chip removal is not limited by the surrounding tool cutting edges. Thus, the tool does not tend to be clogged with chips, which could damage the cutting edges of the cutting profile.

The tooth system of a tool according to the invention can have an angle of inclination in the radial direction like that of a helical gearing. In this case, the tooth system has an optimal design so that, across its profile width during skiving at at least one point in time, it is aligned along the direction of the tooth spaces, for a straight-cut tooth thus when engaging in the workpiece at at least one point in time parallel to the workpiece axis of rotation. The tooth system can also be tapered from the cutting surfaces of the cutting profile over the profile width. In this way, so-called constructive clearance angles can be created ensuring a collision-free cutting edge engagement in the area of the open spaces. In order to support this effect, alternatively or additionally, both the profile height and the profile thickness of the teeth of the tooth system of the tool according to the invention can reduce from the respective cutting surfaces of the cutting profile in the direction of the axis of rotation.

In a method according to the invention for producing a tooth system profile on a workpiece rotating about a workpiece axis by performing a coupled skiving movement between a skiving tool rotating about a tool axis and the workpiece according to the invention, a tool according to the invention is used, wherein the tool axis and the workpiece axis in the manner of the axes of rotation of an angular gear are aligned intersecting with each other at an axis intersection angle and at the same time an offset is provided between the workpiece axis and the tool axis, in order to achieve a speed component in the tooth gap direction of the tooth system profile to be created between the workpiece and the tool.

When an offset is mentioned here between a tool and a workpiece, then this offset is comparable to the offset usually provided with a bevel gear or a crown gear. If there is no offset, then the axes of rotation of the tool and the workpiece intersect at a point. In the case of an offset, as prescribed by the invention, the axes of rotation of the tool and the workpiece do not intersect, however. The axis intersection angle existing between them can then only be determined by projecting the workpiece axis of rotation in a plane in which the axis of rotation of the tool lies, or vice versa. The shortest distance between the respective plane and the axis of rotation disposed remotely from this is referred to as "offset". The axis intersection angle between the workpiece axis and the tool axis in a projection of the axes onto the plane originally spanned by the axes, corresponding to a consideration of the axes along the transversal distance formed by the offset, remains unaffected by the offset here.

As a result of the offset, between the generating tooth flanks of the cutting profile and the tooth profile to be created an additional sliding movement in the tooth gap direction occurs. In the skiving method according to the invention this sliding movement is used to create the cutting speed. In a method according to the invention the feed component of the relative movement of the cutting profile and the tooth profile to be created in the tooth gap direction necessary for chip formation is not achieved by a reciprocal swivelling of the tool and workpiece axes, but is imposed upon the process by specifying an offset. The greater the offset between the tool and the workpiece axes, the greater is the cutting speed or the translational sliding component along the tooth flank, which at the cutting edge is converted from the tool rotation into a cutting movement in the tooth gap direction.

In the skiving method according to the invention for producing a tooth profile on a workpiece, accordingly a swivelling of the spindle axis relative to the axis of rotation can be dispensed with. Consequently, the method can be carried out on a tool machine which comprises no swivel axis for swivelling the spindle axis counter to the workpiece axis, but merely provides for a translational positioning of the spindle axis relative to the workpiece axis of rotation. With the lower demands on the machine tool to be provided as a result of the method according to the invention, machine costs and accordingly also manufactured part costs can be reduced compared with prior art skiving methods. The invention thus provides a method which in a particularly simple and cost-effective manner allows the production of a tooth system using the skiving method.

The ways of working and advantages explained above in relation to the method according to the invention apply equally to a device according to the invention, equipped and designed so that with it the skiving according to the invention can be performed. Accordingly, a machine according to the invention for producing a tooth profile on a workpiece by means of skiving comprises a skiving tool, a first rotary drive for rotationally-driving the skiving tool and a workpiece axis, a clamp for retaining the workpiece and a second rotary drive for rotationally-driving the respective workpiece retained in the clamp, wherein the rotary drives are coupled together. According to the invention, with such a machine the tool is modelled in a manner according to the invention, wherein the tool axis and the workpiece axis in the manner of the axes of rotation of an angular gear are aligned intersecting with each other at an axis intersection angle and an offset is provided between the workpiece axis and the tool axis, in order to achieve a cutting speed component in the tooth gap direction of the tooth profile to be created between the workpiece and the tool.

When using the possibilities explained above, or others, for creating a "constructive clearance angle" on a machine according to the invention or when performing the method according to the invention, the axis intersection angle provided between the tool and workpiece axes can be 90°. When the axes are arranged at right angles, the feed movement along the tooth gaps is particularly easy to reproduce and can be performed over a single linear machine axis.

It is also possible, however, by specifying an axis intersection angle deviating from 90°, for example in the range 85-95°, in particular 85° to <90°, to set between the tool and the workpiece an angle of inclination for producing kinematic clearance angles during the skiving.

The control and production engineering effort associated with the production and operation of a machine according to the invention can be minimised by permanently setting the axis intersection angle according to a predetermined optimum angle.

In a variant of the method according to the invention, the tool has indexable cutting inserts. In particular, when using hard metal as the cutting material, the amount of hard metal used can be reduced compared to a one-piece tool and thus the tool costs can be reduced.

The skiving method according to the invention is suitable in particular for the production of straight or helical toothed components, such as cylindrical gears or similar. Thus, for example, pinion shafts, spline shaft connections, belt pulleys or sliding sleeves and similar can be produced with the method according to the invention.

Of course, with the skiving method according to the invention, the known tooth flank modifications, such as, for example, height or width crowing and head or foot relief etc., can be achieved by an adaptation to the process kinematics or the cutting profile.

Furthermore, it is advantageous to avoid swivelling movements and to model the feed and relative movements between the tool and workpiece preferably by linear machine axes, since these guarantee high positional accuracy in a simple manner.

For machining the workpiece over the full tooth width of the respective tooth profile to be produced, the tool according to the invention can be moved along an axis of motion which is aligned axially-parallel with the workpiece axis of rotation. For this purpose, a machine according to the invention can be equipped with an appropriate feed drive.

In the following, the invention is explained in more detail by means of a drawing illustrating an embodiment. The following are shown, schematically in each case:

DETAILED DESCRIPTION OF THE INVENTION

Figure 1:
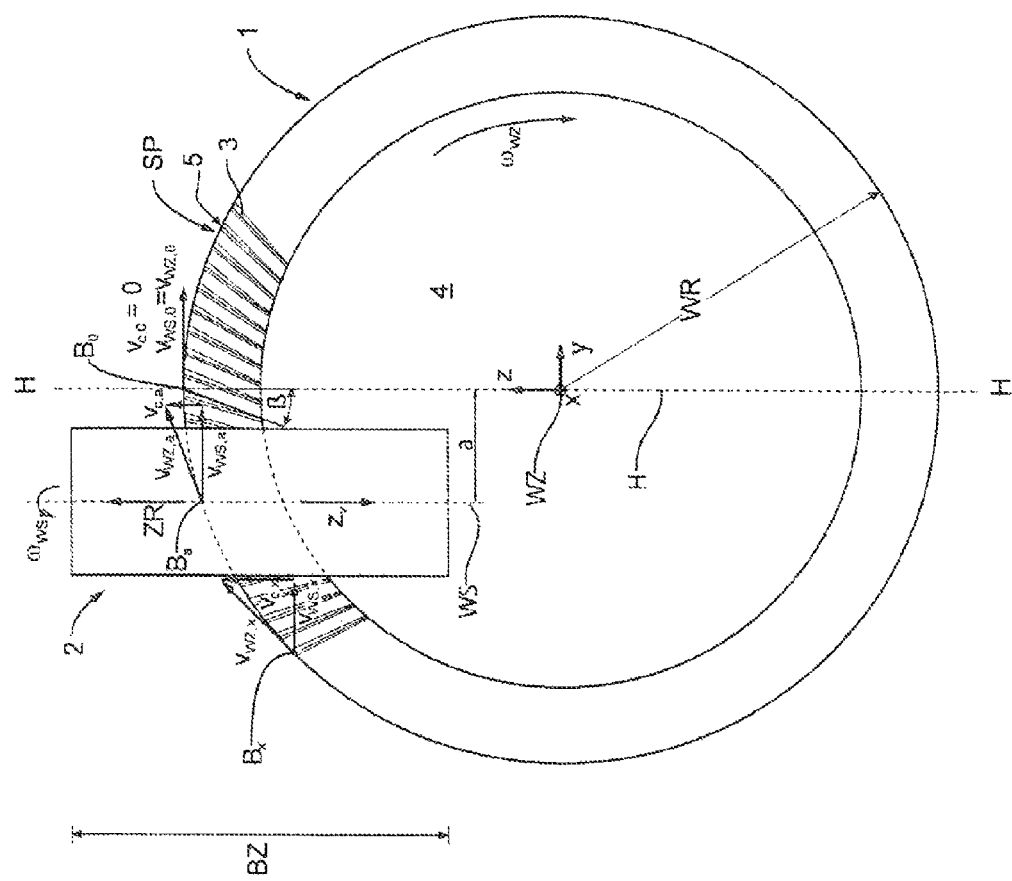
FIG. 1 a tool and a cylindrical workpiece in the skiving operation as a top view.
Figure 2:
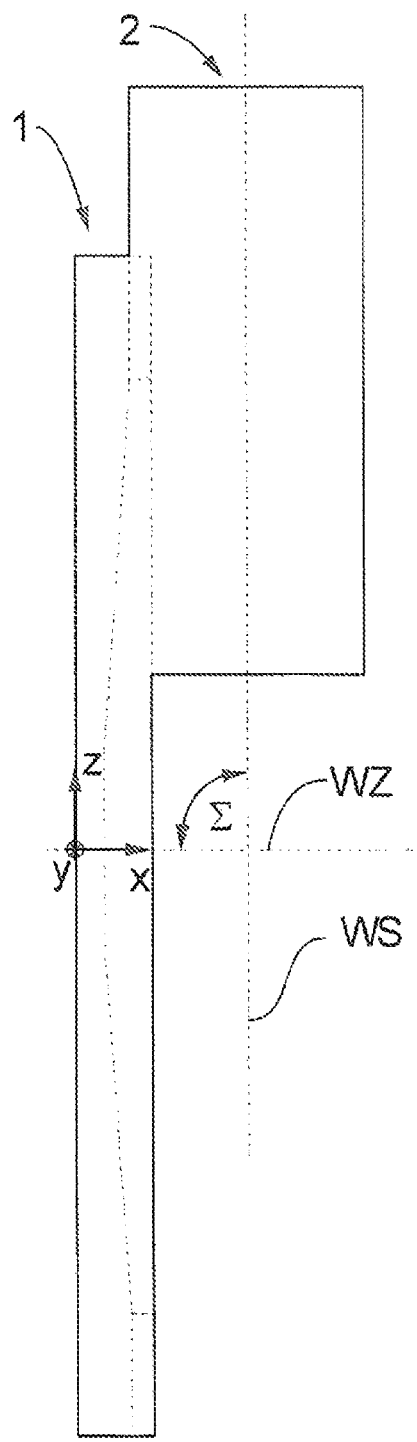
FIG. 2 the tool and the workpiece according to FIG. 1 in a side view.
Figure 3A:
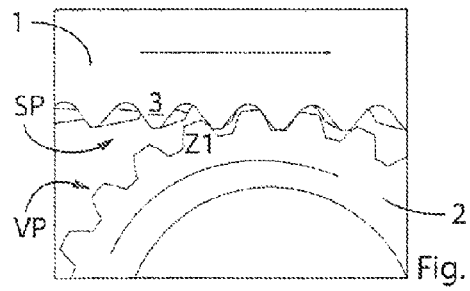
FIGS. 3a-3j snapshots of the engagement of a cutting edge in the production of a tooth profile on a workpiece through skiving in a side view.
Figure 3B:
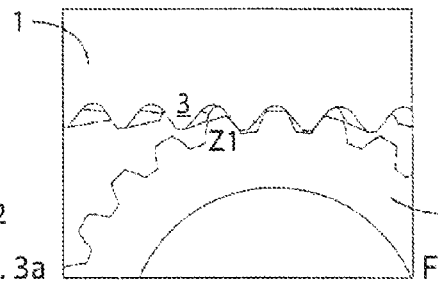
Figure 3C:
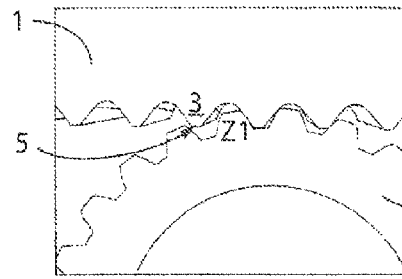
Figure 3D:
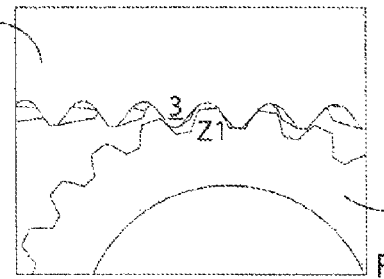
Figure 3E:
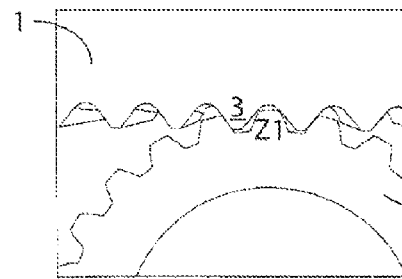
Figure 3F:
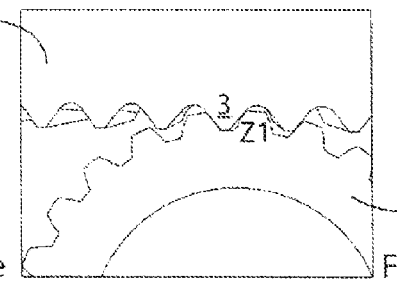
Figure 3G:
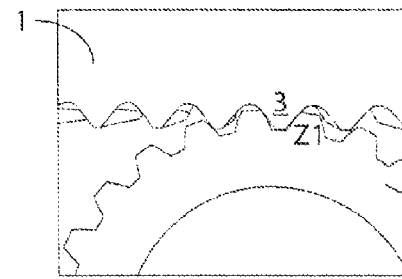
Figure 3H:
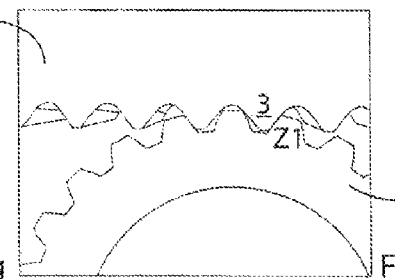
Figure 3I:
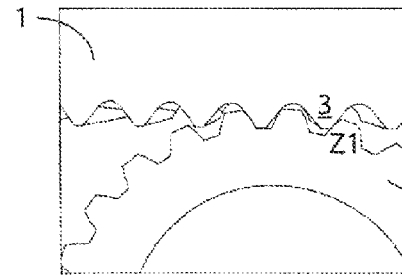
Figure 3J:
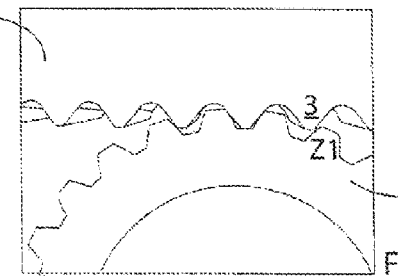

FIGS. 1 and 2 show a simplified representation of a tool 1 modelled as a crown gear and a cylindrical workpiece 2 in a snapshot of the skiving method according to the invention.

To illustrate the engagement relationships and the relative axis positions, a three-dimensional Cartesian coordinates system (x, y, z) is introduced, wherein the tool axis of rotation WZ is aligned coaxially to the x-coordinate. The workpiece axis of rotation WS on the other hand runs parallel to an auxiliary plane H spanning the x and z-axis and is positioned with an offset a to this auxiliary plane H. In the example described here, the offset a corresponds to approximately one quarter of the tool radius WR.

In the example shown here, on the workpiece 1 a spur toothing is created by skiving. Here, the tooth gap direction ZR runs parallel to the workpiece axis of rotation WS.

The tool 1 and the workpiece 2 perform a continuous division movement in relation to one another. Here, the tool rotation $\omega_{WZ}$ about the x-axis and the workpiece rotation $\omega_{WS}$ about the tool axis of rotation WS are coupled according to the tooth ratio of tool 1 and workpiece 2.

The speed vectors shown in FIG. 1 $v_c$, $v_{WZ}$, $v_{WS}$ illustrate schematically how, as a result of the offset a between the workpiece 2 and the tool 1, or their respective axes of rotation WS, WZ, a cutting speed component $v_c$ results along the tooth gap direction ZR of the tooth profile VP to be produced. Here, the speed vectors $v_c$, $v_{WZ}$, $v_{WS}$ for example reproduce the respective circumferential speeds of the tool $v_{WZ}$ and the workpiece $v_{WS}$ in a point of contact B between a tool cutting edge 3 and a tooth flank.

Were there to be no offset a (a=O) between the tool 1 and the workpiece 2, then in the point of contact $B_o$ the circumferential speed $v_{WZ,0}$ of the tool 1 and the circumferential speed $v_{WS,0}$ of the workpiece 2 would be the same. Then no relative movement $v_c$ in tooth gap direction ZR between tool 1 and workpiece 2 would result.

The cutting conditions arising during skiving with, according to the invention, a tool 1 and workpiece 2 offset with an offset a can be illustrated using the contact point $B_a$. The circumferential speed $v_{WS,a}$, $v_{WZ,a}$ of workpiece 2 and tool 1 are in this case not congruent, so that here a cutting speed component $v_{c,a}$ along the tooth gap direction ZR results.

From the contact point $B_x$ that lies in the direction of rotation of the tool 1 before the contact point $B_a$ it is clear that the proportion which is converted from the circumferential speed $v_{WZ}$ at a cutting point into a feed movement or a cutting speed $v_c$ in the tooth gap direction ZR, grows as the offset a increases. Here, the maximum permitted offset a is limited by the necessary clearance and rake angle in the area of the tool cutting edge 3.

In order to machine the workpiece 2 across its full tooth width BZ or the workpiece length an axial feed $z_v$ axially-parallel to the workpiece axis of rotation WS and parallel to the auxiliary plane H is provided. The direction of the axial feed $z_v$ is arbitrary, and can therefore also be reversed in respect of the axial feed $z_v$ shown in the Figure.

As indicated in FIG. 1, the tool 1 modelled as a crown gear with a tooth system SP with teeth 3, which in an edge region bordering the outer circumference of the face 4 of the tool 1 runs in a circular manner about the face 4.

With its front sides on the outer circumference of its teeth 3 the tooth system SP forms a cutting profile, to which each tooth on is front side contributes a cutting surface.

As also illustrated in a simplified manner in FIG. 1, the teeth 3 of the tooth system SP have the flank form typical of a crown gear with an "engagement angle" that reduces from the outside to the inside, wherein the flanks in this case represent the open spaces of the tool 2. Here, the teeth 3 are merely implied and on the tool 1 naturally arranged with a distribution across the entire tool.

In order to provide the clearance angle necessary for the skiving process, the tooth system SP in the radial direction has a helix angle β in the manner of a helical gearing. The helix angle β must be formed taking into account the predetermined offset a so that during chip removal a collision does not occur between the tool 1 and the workpiece 2 in the area of the free spaces. The helix angle β can be formed so that the tooth system SP of teeth 3 across its profile width during skiving at at least one point in time is aligned along the tooth gap direction ZR. Thus, the helix angle β can, for example, correspond to the angle enclosed by the speed vectors of workpiece $v_{WZ,a}$ and tool $v_{WS,a}$.

In addition, the teeth 3 of the tooth system SP starting from their front face cutting surface associated with the outer circumference have a reducing taper over the profile width in the radial direction on the tool axis of rotation WZ. At the same time, both the profile height and the profile thickness of the teeth 3 reduce from the outer circumference of the tool in the direction of the tool axis of rotation WZ.

The axis intersection angle Σ between the workpiece axis of rotation WS and the tool axis of rotation WZ in the embodiment described here is set in a fixed manner at 90°. In order during the skiving to generate a kinematic clearance angle relative to the open spaces of the tool 1, the axis intersection angle Σ may differ from 90°, resulting in an inclination between the tool 1 and the workpiece 2. Preferably, however, such an inclination is dispensed with. Where an axis intersection angle Σ of different from 90° is provided for, this should be low. Such a low inclination of the tool 1 or the workpiece 2 counter to its 90° orientation has no significant influence on the cutting speed $v_c$ of the tool 1, however, in tooth gap direction ZR. The inclination merely concerns the change in the axis intersection angle Σ, so that the workpiece axis of rotation WS continues to be extended parallel to the auxiliary plane H.

FIGS. 3a-3j by means of the tooth Zl of the tooth system profile VP to be produced on the workpiece 2 provide an understanding of how this tooth Zl is produced by the cutting profile 5 present on the tool 1, formed by the teeth 3 of the tooth system SP.

Here, production of the tooth profile VP takes place in a number of passes, wherein the tool 1 after each pass is fed in the direction of the workpiece axis of rotation WS along a feed axis, which is aligned coaxially to the workpiece axis of rotation WZ, until the tooth profile VP has been fully completed.

KEY

1 Tool
2 Workpiece

3 Tooth of tooth system SP
4 Face
5 Cutting profile on the tooth system SP
β Helix angle
$\omega_{WS}$ Workpiece rotation
$\omega_{WZ}$ Tool rotation
a Offset
$B, B_a, B_o, B_x$ Contact points
BZ Tooth width
H Auxiliary plane
SP Tooth system
$v_c$ Cutting speed component along the tooth gap direction ZR
$v_{c,a}$ Cutting speed along the tooth gap direction ZR in contact point $B_a$
$v_{c,x}$ Cutting speed along the tooth gap direction ZR in contact point $B_x$
VP Tooth system profile
$v_{WS}$ Circumferential speed of workpiece 2
$v_{WZ}$ Circumferential speed of tool 1
$v_{WZ,0}$ Circumferential speed of tool 1 in contact point $B_0$
$v_{WS,0}$ Circumferential speed of workpiece 2 in contact point $B_0$
$v_{WZ,a}$ Circumferential speed of tool 1 in contact point $B_a$
$v_{WS,a}$ Circumferential speed of workpiece 2 in contact point $B_a$
$v_{WZ,x}$ Circumferential speed of tool 1 in contact point $B_x$
$v_{WS,x}$ Circumferential speed of workpiece 2 in contact point $B_x$
WR Tool radius
WS Workpiece axis of rotation
WZ Tool axis of rotation
Z1 Tooth
ZR Tooth gap direction
$z_v$ Axial feed

The invention claimed is:

1. A method for producing a tooth profile on a workpiece comprising the steps of performing a coupled skiving movement between a skiving tool and the workpiece, rotating the tool about a tool axis of rotation and rotating the workpiece about a workpiece axis of rotation, wherein the tool comprises a crown gear on the front of which a tooth system with a cutting profile is provided which when in use reproduces the tooth profile on the workpiece, wherein the tool axis of rotation and the workpiece axis of rotation are aligned intersecting each other at an axis intersection angle and wherein an offset is provided between the workpiece axis of rotation and the tool axis of rotation, in order to achieve a cutting speed component in the tooth gap direction of the tooth profile to be created between the workpiece and the tool.

2. The method according to claim 1, wherein the axis intersection angle between the tool axis of rotation and the workpiece axis of rotation is 85-95°.

3. The method according to claim 2, wherein the axis intersection angle between the tool axis of rotation and the workpiece axis of rotation is 90°.

4. The method according to claim 1, wherein the workpiece is moved relative to the tool in a movement direction directed parallel to the workpiece axis of rotation.

* * * * *